United States Patent
Nestle et al.

(10) Patent No.: US 12,168,728 B2
(45) Date of Patent: Dec. 17, 2024

(54) MIXTURE FOR USE IN A FUSED FILAMENT FABRICATION PROCESS

(71) Applicant: BASF SE, Ludwigshafen (DE)

(72) Inventors: Nikolaus Nestle, Heidelberg (DE); Marie-Claire Hermant, Mannheim (DE); Kris Schmidt, Granada Hills, CA (US)

(73) Assignee: BASF SE (DE)

( * ) Notice: Subject to any disclaimer, the term of this patent is extended or adjusted under 35 U.S.C. 154(b) by 0 days.

(21) Appl. No.: 14/806,102

(22) Filed: Jul. 22, 2015

(65) Prior Publication Data

US 2016/0024293 A1    Jan. 28, 2016

Related U.S. Application Data

(60) Provisional application No. 62/027,264, filed on Jul. 22, 2014.

(30) Foreign Application Priority Data

Jan. 23, 2015 (EP) .................................... 15152349

(51) Int. Cl.
| | |
|---|---|
| *C08L 59/02* | (2006.01) |
| *B28B 1/00* | (2006.01) |
| *B28B 11/24* | (2006.01) |
| *B33Y 10/00* | (2015.01) |
| *B33Y 70/10* | (2020.01) |
| *C04B 35/622* | (2006.01) |
| *C04B 35/634* | (2006.01) |
| *C04B 35/638* | (2006.01) |

(52) U.S. Cl.
CPC .............. *C08L 59/02* (2013.01); *B28B 1/001* (2013.01); *B28B 11/243* (2013.01); *B33Y 70/10* (2020.01); *C04B 35/62227* (2013.01); *C04B 35/634* (2013.01); *C04B 35/638* (2013.01); *B33Y 10/00* (2014.12); *C04B 2235/6021* (2013.01); *C04B 2235/6026* (2013.01)

(58) Field of Classification Search
CPC ....................................................... B28B 1/001
See application file for complete search history.

(56) References Cited

U.S. PATENT DOCUMENTS

| | | |
|---|---|---|
| 5,121,329 A | 6/1992 | Crump |
| 5,145,900 A | 9/1992 | Sterzel et al. |
| 5,738,817 A | 4/1998 | Danforth et al. |
| 5,866,058 A * | 2/1999 | Batchelder ............ B29C 64/106 |
| | | 264/237 |
| 5,900,207 A | 5/1999 | Danforth et al. |
| 9,079,356 B2 | 7/2015 | Keinath |
| 2009/0288739 A1 | 11/2009 | Wohlfromm et al. |
| 2012/0033002 A1 | 2/2012 | Seeler et al. |
| 2013/0062820 A1* | 3/2013 | ter Maat ................. C08L 61/02 |
| | | 264/645 |
| 2015/0252164 A1 | 9/2015 | Simancas et al. |

FOREIGN PATENT DOCUMENTS

| | | |
|---|---|---|
| CN | 103980445 A | 8/2014 |
| CN | 104057090 A | 9/2014 |
| CN | 104163634 A | 11/2014 |
| JP | H 11-71190 | 3/1999 |
| WO | WO 2012/028308 A1 | 3/2012 |
| WO | WO 2014/044604 A1 | 3/2014 |
| WO | WO 2014/114563 A1 | 7/2014 |
| WO | WO 2014/170242 A1 | 10/2014 |
| WO | WO 2014/191348 A1 | 12/2014 |
| WO | WO 2015/124557 A1 | 8/2015 |

OTHER PUBLICATIONS

Lock, T. (Sep. 8, 2013). "3D printing with Acetal Filament". Retrieved from http://blog.think3dprint3d.com/2013/09/3d-printing-with-acetal-filament.html) (Year: 2013).*
Foley, N. (Aug. 12, 2013). "3D Printing in Acetal". Retreived from https://ultimaker.com/en/community/3646-3c-printing-in-acetal) (Year: 2013).*
International Search Report and Written Opinion issued Oct. 7, 2015 in PCT/EP2015/066728.
U.S. Appl. No. 14/430,378 filed Mar. 23, 2015, US2015/0252164 A1, Simancas, et al.
U.S. Appl. No. 14/762,518 filed Jul. 22, 2015, Nestle, et al.
Kirk-Othmer, Encyclopedia of Chemical Technology 3rd Ed., vol. 1, 1978, 28 pages.
Kirk-Othmer, Encyclopedia of Chemical Technology 3rd Ed., vol. 18, 26 pages.
Japanese Office Action mailed on Mar. 26, 2019 in corresponding Japanese Patent Application No. 2017-503849 filed Jul. 22, 2015, (with English translation).

* cited by examiner

*Primary Examiner* — Erin Snelting
(74) *Attorney, Agent, or Firm* — Faegre Drinker Biddle & Reath LLP

(57) ABSTRACT

The use of a mixture (M) comprising
- (a) from 40 to 70% by volume of an inorganic powder (IP) based on the total volume of the mixture (M),
- (b) from 30 to 60% by volume based on the total volume of the mixture (M) of a binder (B) comprising
  - (b1) from 50 to 96% by weight of at least one polyoxymethylene (POM) based on the total weight of the binder (B),
  - (b2) from 2 to 35% by weight of at least one polyolefin (PO) based on the total weight of the binder (B),
  - (b3) from 2 to 40% by weight of at least one further polymer (FP) based on the total weight of the binder (B)

in a fused filament fabrication process.

9 Claims, No Drawings

MIXTURE FOR USE IN A FUSED FILAMENT FABRICATION PROCESS

The present invention relates to the use of a mixture comprising an inorganic powder and a binder in a fused filament fabrication process, and to a process for producing three-dimensional objects by a fused filament fabrication process.

A task often encountered in recent times is the production of prototypes and models of metallic or ceramic bodies, in particular of prototypes and models exhibiting complex geometries. Especially for the production of prototypes, a rapid production process is necessary. For this so called "rapid prototyping", different processes are known which can be subdivided into laser-based processes and processes without the use of a laser.

The selective laser sintering (SLS) process is a laser-based process wherein the laser selectively fuses powdered material, for example a metal powder or a metal powder comprising a binder by scanning cross sections generated from a 3D digital description of the part on the surface of a powder bed. After each cross-section is scanned, the powder bed is lowered by one layer thickness, a new layer of powder material is supplied on top and the process is repeated until the part is completed.

Laser-based processes are costly as the use of high power lasers (for example a carbon dioxide laser) is involved.

More economical is the fused filament fabrication process (FFF), also known as "fused deposition modeling" (FDM). The fused filament fabrication process is an additive manufacturing technology. A three-dimensional object is produced by extruding a thermoplastic material through a nozzle to form layers as the thermoplastic material hardens after extrusion. The nozzle is heated to heat the thermoplastic material past its melting and/or glass transition temperature and is then deposited by the extrusion head on a base to form the three-dimensional object in a layer-wise fashion. The thermoplastic material is typically selected and its temperature is controlled so that it solidifies substantially immediately upon extrusion or dispensing onto the base with the build-up of multiple layers to form the desired three-dimensional object.

In order to form each layer, drive motors are provided to move the base and/or the extrusion nozzle (dispending head) relative to each other in a predetermined pattern along the x-, y- and z-axis. The FFF-process was first described in U.S. Pat. No. 5,121,329.

Typical materials for the production of three-dimensional objects are thermoplastic materials. The production of three-dimensional metallic or ceramic objects by fused filament fabrication is only possible if the metal or ceramic material has a low melting point so that it can be heated and melted by the nozzle. If the metal or ceramic material has a high melting point, it is necessary to provide the metal or ceramic material in a binder composition to the extrusion nozzle. The binder composition usually comprises a thermoplastic material. When depositing the mixture of a metal or ceramic material in a binder on a base, the formed three-dimensional object is a so called "green body" which comprises the metal or ceramic material in a binder. To receive the desired metallic or ceramic object, the binder has to be removed and finally the object has to be sintered.

U.S. Pat. No. 5,738,817 and U.S. Pat. No. 5,900,207 describe a fused deposition modeling process for making a three-dimensional article by using a mixture of a particulate composition dispersed in a binder. The particulate composition comprises ceramic materials, elemental metals, metal alloys and/or steels. The binder consists of a polymer, a wax, an elastomer, a tackifier and a plasticizer. The binder is removed from the article by a burnout cycle during which the article is slowly heated to cause some of the components of the binder system to melt and flow out of the article. After these components are removed from the article, the temperature is increased and the other components of the binder are thermally decomposed and are removed from the article by diffusion and evaporation. This debinding process is very time consuming. Furthermore, the melting of the binder before evaporation leads to distortion of the article and moreover, the high temperatures may lead to blistering on the surface or internal cracking and/or delamination of the article.

US 2012/0033002 describes a process for the preparation of three-dimensional thermomagnetic objects by fused filament fabrication using a mixture of a thermomagnetic powder and a binder system. This binder system comprises polymers like polyesters, polysulfones, poly(ether sulfones) and styrene copolymers. After the printing of the three-dimensional object, the binder has to be removed. For this debinding step, very high temperatures are necessary. The high temperatures that are necessary for the debinding step may, as stated above, lead to blistering on the surface of the three-dimensional object, internal cracking and/or delamination of the article.

The object underlying the present invention is therefore to provide a mixture for the use in a fused filament fabrication (FFF) process comprising an inorganic powder and a binder which does not have the above-mentioned disadvantages of the prior art or has them only to a significantly reduced extent. Another object underlying the present invention is to provide a fused filament fabrication (FFF) process which should be carried out more simply, safer and more cost efficient than described in the state of the art.

This object is achieved by the use of a mixture (M) comprising
  (a) from 40 to 70% by volume of an inorganic powder (IP) based on the total volume of the mixture (M),
  (b) from 30 to 60% by volume based on the total volume of the mixture (M) of a binder (B) comprising
    (b1) from 50 to 96% by weight of at least one polyoxymethylene (POM) based on the total weight of the binder (B),
    (b2) from 2 to 35% by weight of at least one polyolefin (PO) based on the total weight of the binder (B),
    (b3) from 2 to 40% by weight of at least one further polymer (FP) based on the total weight of the binder (B)
in a fused filament fabrication process.

Another object of the present invention is a process for the production of a three-dimensional green body by a fused filament fabrication process comprising the steps
  i) providing the inventive mixture (M) to a nozzle,
  ii) heating the mixture (M) to a temperature ($T_M$),
  iii) depositing the mixture (M) into a build chamber using a layer-based additive technique to form the three-dimensional green body.

The "layer-based additive technique" for the purpose of the present invention is a technique wherein a first layer of material is deposited on a base in a build chamber to form a first layer of material, followed by the deposition of a second layer of material on the first layer of material, followed by the deposition of a third layer of material and so on. The number of layers deposited by the layer-based additive technique depends on the size of the three-dimensional object. Moreover, the number of layers depends on the thickness of the layers deposited.

It has surprisingly been found that a mixture (M), which comprises an inorganic powder (IP) as component (a) and a binder (B) as component (b), can be used in a fused filament fabrication process using the layer-based additive technique.

Polyoxymethylene (POM), the main component of the binder (B), is known to have a high crystallization rate and to harden quickly. Furthermore, polyoxymethylene (POM) is known not to be a sticky polymer as it has a low coefficient of friction.

Consequently, it is surprising that layers of a mixture (M) comprising an inorganic powder (IP) and a binder (B), which comprises polyoxymethylene (POM), adhere to each other, although polyoxymethylene (POM) has such a low coefficient of friction, and that as a consequence of this adherence the mixture (M) can be used in a fused filament fabrication process using the layer-based additive technique.

The mixture (M) shows a good flowability at the processing temperatures and at the shear rates used in the fused filament fabrication process. Moreover, no demixing of the inorganic powder (IP) and the binder (B) of the mixture (M) occurs and usually no stress cracks arise during the hardening. Another advantage of the present invention is that the binder (B) can easily be removed at temperatures below the melting point of the binder (B), resulting in only little or even no deformation of the three-dimensional object.

Mixture (M)

The mixture (M) according to the present invention comprises as component (a) from 40 to 70% by volume of an inorganic powder (IP) and as component (b) from 30 to 60% by volume of a binder (B), based on the total volume of the mixture (M), where the % by volume of component (a) and (b) generally add up to 100%.

Preferably, the mixture (M) comprises as component (a) from 45 to 65% by volume of an inorganic powder (IP) and as component (b) from 35 to 55% by volume of a binder (B), based on the total volume of the mixture (M), where the % by volume of component (a) and (b) generally add up to 100%.

Particularly preferably, the mixture (M) comprises as component (a) from 48 to 60% by volume of an inorganic powder (IP) and as component (b) from 40 to 52% by volume of a binder (B), based on the total volume of the mixture (M), where the % by volume of component (a) and (b) generally add up to 100%.

In one embodiment of the present invention, the mixture (M) comprises a component (c). Preferably, the mixture (M) comprises as component (c) from 0.1 to 5% by volume of at least one dispersant, particularly preferably from 0.2 to 4% by volume of at least one dispersant and most preferably from 0.5 to 2% by volume of at least one dispersant, based on the total volume of the mixture (M).

Another object of the present invention is therefore the use of a mixture (M) in a fused filament fabrication process, wherein the mixture (M) comprises as component (c) from 0.1 to 5% by volume of at least one dispersant based on the total volume of the mixture (M).

To the person skilled in the art it is clear that if the mixture (M) comprises component (c) the % by volume of component (a), component (b) and component (c) generally add up to 100%.

The mixture (M) can be prepared by any method known to the skilled person. Preferably the mixture (M) is produced by melting component (b) and mixing in component (a) and, if appropriate, component (c). For example, component (b) can be melted in a twin screw extruder at temperatures of preferably from 150 to 220° C., in particular of from 170 to 200° C. Component (a) is subsequently metered in the required amount into the melt stream of component (b) at temperatures in the same range. Component (a) advantageously comprises the at least one dispersant of component (c) on the surface. However, the mixture (M) of the invention can also be produced by melting component (b) and optionally component (c) in the presence of component (a) at temperatures of from 150 to 220° C., preferably of from 170 to 200° C.

A particularly preferred apparatus for metering component (a) comprises as essential element a transport screw which is located in a heatable metal cylinder and transports component (a) into the melt of component (b). The above described process has the advantage over mixing of the components at room temperature and subsequent extrusion with an increase in temperature that decomposition of polyoxymethylene (POM) used as binder as a result of the high shear forces occurring in this variant is largely avoided.

The components of the mixture (M) are presented in more detail below.

Component (a)/Inorganic Powder (IP)

The terms "component (a)" and "inorganic powder (IP)" for the purpose of the present invention are synonymous and are used interchangeably throughout the present invention.

According to the present invention, the mixture (M) comprises from 40 to 70% by volume of component (a). In a preferred embodiment, the mixture (M) comprises from 45 to 65% by volume of component (a) and particularly preferably from 48 to 60% by volume of component (a), based on the total volume of the mixture (M).

As component (a), any known inorganic powder (IP) can be used. Preferably, a sinterable inorganic powder (IP) is used as component (a). In a further preferred embodiment, the inorganic powder (IP) is a powder of at least one inorganic material selected from the group consisting of a metal, a metal alloy and a ceramic material.

Another object of the present invention is therefore the use of a mixture (M) in a fused filament fabrication process, wherein the inorganic powder (IP) is a powder of at least one inorganic material selected from the group consisting of a metal, a metal alloy and a ceramic material.

"An inorganic powder (IP)" means precisely one inorganic powder (IP) as well as a mixture of two or more inorganic powders (IP). The same holds true for the term "an inorganic material". "An inorganic material" means precisely one inorganic material as well as mixtures of two or more inorganic materials.

"A metal" means precisely one metal as well as mixtures of two or more metals. A metal within the present invention can be selected from any metal of the periodic table of the elements which is stable under the conditions of a fused filament fabrication process and which can form three-dimensional objects. Preferably, the metal is selected from the group consisting of aluminium, yttrium, titanium, zirconium, vanadium, niobium, chromium, molybdenum, tungsten, manganese, iron, carbonyl iron powder (CIP), cobalt, nickel, copper, silver, zinc and cadmium, more preferably, the metal is selected from the group consisting of titanium, niobium, chromium, molybdenum, tungsten, manganese, iron, carbonyl iron powder (CIP), nickel and copper. With particular preference, the metal is selected from the group consisting of titanium, iron and carbonyl iron powder (CIP).

Carbonyl iron powder (CIP) is highly pure iron powder, prepared by chemical decomposition of purified iron pentacarbonyl.

"A metal alloy" means precisely one metal alloy as well as mixtures of two or more metal alloys. Within the context of the present invention, the term "metal alloy" means a solid solution or a partial solid solution, which exhibits metallic properties and comprises a metal and an other element. "A metal" means, as stated above precisely one metal and also mixtures of two or more metals. The same applies to "an other element". "An other element" means precisely one other element and also mixtures of two or more other elements.

Solid solution metal alloys exhibit a single solid phase microstructure while partial solid solution metal alloys exhibit two or more solid phases. These two or more solid phases can be homogeneous distributed in the metal alloy, but they can also be heterogeneous distributed in the metal alloy.

The metal alloys can be prepared according to any process known to the person skilled in the art. For example, the metal can be melted and the other element can be added to the molten metal. However, it is also possible, to admix the metal and the other element directly to the mixture (M) without the preparation of a metal alloy before. The metal alloy will then be formed during the process of the preparation of the three-dimensional object.

Concerning the metal, the above-stated embodiments and preferences for the metal apply.

The other element can be selected from the metals described above. However, the other element differs from the metal comprised in the metal alloy.

The other element can be selected from any element of the periodic table, which forms a metal alloy that is stable under the conditions of a fused filament fabrication process or, which is stable or forms stable alloys with the metal under the conditions of a fused filament process. In a preferred embodiment of the present invention the other element is selected from the group consisting of the aforementioned metals, boron, carbon, silicon, phosphorous, sulfur, selenium and tellurium. Particularly preferably, the at least one other element is selected from the group consisting of the aforementioned metals, boron, carbon, silicon, phosphorous and sulfur.

Preferably, the metal alloy according to the present invention comprises steel.

"A ceramic material" means precisely one ceramic material as well as mixtures of two or more ceramic materials. In the context of the present invention, the term "ceramic material" means a non-metallic compound of a metal or a first metalloid, and a non-metal or a second metalloid.

"A metal" means precisely one metal and also mixtures of two or more metals. The same applies to "a non-metal" and "a first metalloid", as well as "a second metalloid". "A non-metal" means precisely one non-metal and also mixtures of two or more non-metals. "A first metalloid" means precisely one first metalloid and also mixtures of two or more first metalloids. "A second metalloid" means precisely one second metalloid and also mixtures of two or more second metalloids.

Non-metals are known per se to the person skilled in the art. The non-metal according to the present invention can be selected from any non-metal of the periodic table. Preferably, the at least one non-metal is selected from the group consisting of carbon, nitrogen, oxygen, phosphorus and sulfur.

Metalloids are as well known per se to the skilled person. The first metalloid and the second metalloid can be selected from any metalloid of the periodic table. Preferably, the first metalloid and/or the second metalloid are selected from the group consisting of boron and silicon. It should be clear that the first metalloid and the second metalloid differ from each other. For example, if the first metalloid is boron, then the second metalloid is selected from any other metalloid of the periodic table of the elements besides boron.

In one embodiment of the present invention, the ceramic material is selected from the group consisting of oxides, carbides, borides, nitrides and silicides. In a preferred embodiment the ceramic material is selected from the group consisting of MgO, CaO, $SiO_2$, $Na_2O$, $Al_2O_3$, $ZrO_2$, $Y_2O_3$, SiC, $Si_3N_4$, TiB and AlN. Particularly preferred, the ceramic material is selected from the group consisting of $Al_2O_3$, $ZrO_2$ and $Y_2O_3$.

For the preparation of the inorganic powder (IP), the inorganic material has to be pulverized. To pulverize the inorganic material, any method known to the person skilled in the art can be used. For example, the inorganic material can be ground. The grinding for example can take place in a classifier mill, in a hammer mill or in a ball mill.

The carbonyl iron powder (CIP) is prepared by chemical decomposition of purified iron pentacarbonyl.

The particle sizes of the inorganic powders (IP) used as component (a) are preferably from 0.1 to 80 µm, particularly preferably from 0.5 to 50 µm, more preferably from 0.1 to 30 µm, measured by laser diffraction.

Another object of the present invention is therefore the use of a mixture (M) in a fused filament fabrication process, wherein the particle size of the inorganic powder (IP) is from 0.1 to 80 µm.

For example, the organic powder (IP) has
a $D_{10}$ value of <3 µm,
a $D_{50}$ value of <8 µm and
a $D_{90}$ value of <21 µm.

"$D_{10}$ value" within the context of the present invention means that 10 vol.-% of the particles of the inorganic powder (IP) based on the total volume of the particles of the inorganic powder (IP) are smaller than the $D_{10}$ value and 90 vol.-% of the particles of the inorganic powder (IP) based on the total volume of the particles of the inorganic powder (I) are larger than the $D_{10}$ value.

"$D_{50}$ value" within the context of the present invention means that 50 vol.-% of the particles of the inorganic powder (IP) based on the total volume of the particles of the inorganic powder (IP) are smaller than the $D_{50}$ value and 50 vol.-% of the particles of the inorganic powder (IP) based on the total volume of the particles of the inorganic powder (I) are larger than the $D_{50}$ value.

"$D_{90}$ value" within the context of the present invention means that 90 vol.-% of the particles of the inorganic powder (IP) based on the total volume of the particles of the inorganic powder (IP) are smaller than the $D_{90}$ value and 10 vol.-% of the particles of the inorganic powder (IP) based on the total volume of the particles of the inorganic powder (I) are larger than the $D_{90}$ value.

Component (b)/Binder (B)

The terms "component (b)" and "binder (B)" for the purpose of the present invention are synonymous and are used interchangeably throughout the present invention.

According to the present invention, the mixture (M) comprises from 30 to 60% by volume of component (b). In a preferred embodiment, the mixture (M) comprises from 35 to 55% by volume of component (b) and particularly preferably from 40 to 52% by volume of component (b), based on the total volume of the mixture (M).

According to the present invention, component (b) (the binder (B)) comprises as component (b1) from 50 to 96% by weight of at least one polyoxymethylene (POM), as component (b2) from 2 to 35% by weight of at least one polyolefin (PO) and as component (b3) from 2 to 40% by weight of at least one further polymer (FP), each based on the total weight of the binder (B), where the % by weight of components (b1), (b2) and (b3) generally add up to 100%.

In a preferred embodiment, component (b) (the binder (B)) comprises as component (b1) from 60 to 90% by weight of at least one polyoxymethylene (POM), as component (b2) from 3 to 20% by weight of at least one polyolefin (PO) and as component (b3) from 5 to 30% by weight of at least one further polymer (FP), each based on the total weight of the binder (B), where the % by weight of components (b1), (b2) and (b3) usually add up to 100%.

Particularly preferred, component (b) (the binder (B)) comprises as component (b1) from 70 to 85% by weight of at least one polyoxymethylene (POM), as component (b2) from 4 to 15% by weight of at least one polyolefin (PO) and as component (b3) from 10 to 26% by weight of at least one further polymer (FP), each based on the total weight of the binder (B), where the % by weight of components (b1), (b2) and (b3) add up to 100%.

According to the present invention, component (b1) differs from component (b2), component (b2) differs from component (b3) and component (b3) differs from component (b1). However, component (b1), component (b2) and component (b3) can comprise identical building units and, for example, differ in a further building unit and/or differ in the molecular weight.

The components (b1), (b2) and (b3) of the binder (B) are described in more detail below.

Component (b 1)/Polyoxymethylene (POM)

The terms "component (b1)" and "polyoxymethylene (POM)" for the purpose of the present invention are synonymous and are used interchangeably throughout the present invention.

According to the present invention, the binder (B) comprises from 50 to 96% by weight of component (b1). In a preferred embodiment, the binder (B) comprises from 60 to 90% by weight of component (b1) and particularly preferably from 70 to 85% by weight of component (b1), based on the total amount of the binder (B).

As component (b1), at least one polyoxymethylene (POM) is used. "At least one polyoxymethylene (POM)" within the present invention means precisely one polyoxymethylene (POM) and also mixtures of two or more polyoxymethylenes (POM).

For the purpose of the present invention, the term "polyoxymethylene (POM)" encompasses both, polyoxymethylene (POM) itself, i. e. polyoxymethylene (POM) homopolymers, and also polyoxymethylene (POM) copolymers and polyoxymethylene (POM) terpolymers.

Polyoxymethylene (POM) homopolymers usually are prepared by polymerization of a monomer selected from a formaldehyde source (b1a).

The term "formaldehyde source (b1a)" relates to substances which can liberate formaldehyde under the reaction conditions of the preparation of polyoxymethylene (POM).

The formaldehyde sources (b1a) are advantageously selected from the group of cyclic or linear formals, in particular from the group consisting of formaldehyde and 1,3,5-trioxane. 1,3,5-trioxane is particularly preferred.

Polyoxymethylene (POM) copolymers are known per se and are commercially available. They are usually prepared by polymerization of trioxane as main monomer. In addition, comonomers are concomitantly used. The main monomers are preferably selected from among trioxane and other cyclic or linear formals or other formaldehyde sources (b1a).

The expression "main monomers" is intended to indicate that the proportion of these monomers in the total amount of monomers, i. e. the sum of main monomers and comonomers, is greater than the proportion of the comonomers in the total amount of monomers.

Quite generally, polyoxymethylene (POM) according to the present invention has at least 50 mol-% of repeating units —CH$_2$O— in the main polymer chain. Suitable polyoxymethylene (POM) copolymers are in particular those which comprise the repeating units —CH$_2$O— and from 0.01 to 20 mol-%, in particular from 0.1 to 10 mol-% and very particularly preferably from 0.5 to 6 mol-% of repeating units of the formula (I),

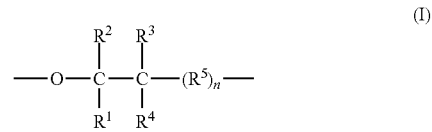

wherein

R$^1$ to R$^4$ are each independently of one another selected from the group consisting of H, C$_1$-C$_4$-alkyl and halogen-substituted C$_1$-C$_4$-alkyl;

R$^5$ is selected from the group consisting of a chemical bond, a (—CR$^{5a}$R$^{5b}$—) group and a (—CR$^{5a}$R$^{5b}$O—) group, wherein R$^{5a}$ and R$^{5b}$ are each independently of one another selected from the group consisting of H and unsubstituted or at least monosubstituted C$_1$-C$_4$-alkyl, wherein the substituents are selected from the group consisting of F, Cl, Br, OH and C$_1$-C$_4$-alkyl;

n is 0, 1, 2 or 3.

If n is 0, then R$^5$ is a chemical bond between the adjacent carbon atom and the oxygen atom. If R$^5$ is a (—CR$^{5a}$R$^{5b}$O—) group, then the oxygen atom (O) of the (—CR$^{5a}$R$^{5b}$O—) group is bound to another carbon atom (C) of formula (I) and not to the oxygen atom (O) of formula (I). In other words, formula (I) does not comprise peroxide compounds. The same holds true for formula (II).

Within the context of the present invention, definitions such as C$_1$-C$_4$-alkyl, as for example defined above for the radicals R$^1$ to R$^4$ in formula (I), mean that this substituent (radical) is an alkyl radical with a carbon atom number from 1 to 4. The alkyl radical may be linear or branched and also optionally cyclic. Alkyl radicals which have both a cyclic component and also a linear component likewise fall under this definition. Examples of alkyl radicals are methyl, ethyl, n-propyl, iso-propyl, butyl, iso-butyl, sec-butyl and tert-butyl.

In the context of the present invention, definitions, such as halogen-substituted C$_1$-C$_4$-alkyls, as for example defined above for the radicals R$^1$ to R$^4$ in formula (I), mean that the C$_1$-C$_4$-alkyl is substituted by at least one halogen. Halogens are F (fluorine), Cl (chlorine), Br (bromine) and I (iodine).

The repeating units of formula (I) can advantageously be introduced into the polyoxymethylene (POM) copolymers by ring-opening of cyclic ethers as first comonomers (b1b). Preference is given to first comonomers (b1b) of the general formula (II),

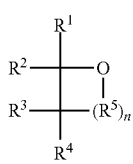

wherein
R¹ to R⁵ and n have the meanings as defined above for the general formula (I).

As first comonomers (b1b) mention may be made for example of ethylene oxide, 1,2-propylene oxide, 1,2-butylene oxide, 1,3-butylene oxide, 1,3-dioxane, 1,3-dioxolane and 1,3-dioxepane (=butanediol formal, BUFO) as cyclic ethers and also linear oligoformals or polyformals such as polydioxolane or polydioxepane. 1,3-dioxolane and 1,3-dioxepane are particularly preferred first comonomers (b1b), very particular preferred is 1,3-dioxepane as first comonomer (b1b).

Polyoxymethylene (POM) polymers which can be obtained by reaction of a formaldehyde source together with the first comonomer (b1b) and a second comonomer (b1c) are likewise suitable. The addition of the second comonomer (b1c) makes it possible to prepare, in particular, polyoxymethylene (POM) terpolymers.

The second comonomer (b1c) is preferably selected from the group consisting of a compound of formula (III) and a compound of formula (IV),

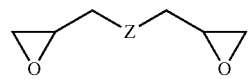

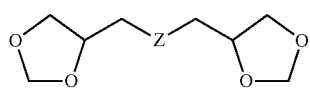

wherein
Z is selected from the group consisting of a chemical bond, an (—O—) group and an (—O—R⁶—O—) group,
wherein
R⁶ is selected from the group consisting of unsubstituted $C_1$-$C_8$-alkylene and $C_3$-$C_8$-cycloalkylene.

Within the context of the present invention, definitions such as $C_1$-$C_8$-alkylene means $C_1$-$C_8$-alkanediyle. The $C_1$-$C_8$-alkylene is an hydrocarbon having two free valences and a carbon atom number of from 1 to 8. The $C_1$-$C_8$-alkylene according to the present invention can be branched or unbranched.

Within the context of the present invention, definitions such as $C_3$-$C_8$-cycloalkylene means $C_3$-$C_8$-cycloalkanediyle. A $C_3$-$C_8$-cycloalkylene is a cyclic hydrocarbon having two free valences and a carbon atom number of from 3 to 8. Hydrocarbons having two free valences, a cyclic and also a linear component, and a carbon atom number of from 3 to 8 likewise fall under this definition.

Preferred examples of the second comonomer (b1c) are ethylene diglycidyl, diglycidyl ether and diethers prepared from glycidyl compounds and formaldehyde, dioxane or trioxane in a molar ratio of 2:1 and likewise diethers prepared from 2 mol of a glycidyl compound and 1 mol of an aliphatic diol having from 2 to 8 carbon atoms, for example the diglycidyl ether of ethylene glycol, 1,4-butanediol, 1,3-butanediol, 1,3-cyclobutanediol, 1,2-propanediol and 1,4-cyclohexanediol.

In a preferred embodiment component (b1) is a polyoxymethylene (POM) copolymer which is prepared by polymerization of from at least 50 mol-% of a formaldehyde source, from 0.01 to 20 mol-% of at least one first comonomer (b1 b) and from 0 to 20 mol-% of at least one second comonomer (b1c).

In a particularly preferred embodiment component (b1) is a polyoxymethylene (POM) copolymer which is prepared by polymerization of from 80 to 99.98 mol-%, preferably from 88 to 99 mol-% of a formaldehyde source, from 0.1 to 10 mol-%, preferably from 0.5 to 6 mol-% of at least one first comonomer (b1b) and from 0.1 to 10 mol-%, preferably from 0.5 to 6 mol-% of at least one second comonomer (b1c).

In a further preferred embodiment component (b1) is a polyoxymethylene (POM) copolymer which is prepared by polymerization of from at least 50 mol-% of a formaldehyde source, from 0.01 to 20 mol-% of at least one first comonomer (b1 b) of the general formula (II) and from 0 to 20 mol-% of at least one second comonomer (b1c) selected from the group consisting of a compound of formula (III) and a compound of formula (IV).

Another object of the present invention is therefore the use of a mixture (M) in a fused filament fabrication process, wherein component (b1) is a polyoxymethylene (POM) copolymer which is prepared by polymerization of
from at least 50 mol-% of a formaldehyde source (b1a),
from 0.01 to 20 mol-% of at least one first comonomer (b1b) of the general formula (II)

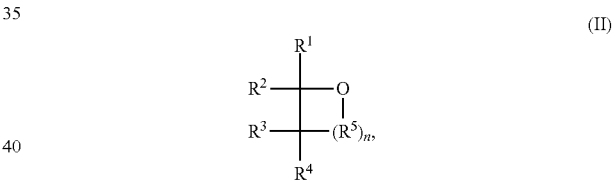

wherein
R¹ to R⁴ are each independently of one another selected from the group consisting of H, $C_1$-$C_4$-alkyl and halogen-substituted $C_1C_4$-alkyl;
R⁵ is selected from the group consisting of a chemical bond, a (—CR$^{5a}$R$^{5b}$—) group and a (—CR$^{5a}$R$^{5b}$O—) group,
wherein
R$^{5a}$ and R$^{5b}$ are each independently of one another selected from the group consisting of H and unsubstituted or at least monosubstituted $C_1$-$C_4$-alkyl,
wherein the substituents are selected from the group consisting of F, Cl, Br, OH and $C_1$-$C_4$-alkyl;
n is 0, 1, 2 or 3;
and
from 0 to 20 mol-% of at least one second comonomer (b1c) selected from the group consisting of a compound of formula (III) and a compound of formula (IV)

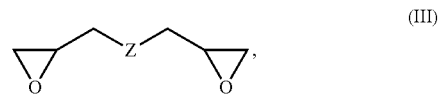

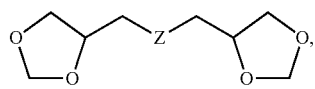 (IV)

wherein z is selected from the group consisting of a chemical bond, an (—O—) group and an (—O—R$^6$—O—) group, wherein R$^6$ is selected from the group consisting of unsubstituted C$_1$-C$_8$-alkylene and C$_3$-C$_8$-cycloalkylene.

In a preferred embodiment of the present invention at least some of the OH-end groups of the polyoxymethylene (POM) are capped. Methods for capping OH-end groups are known to the skilled person. For example, the OH-end groups can be capped by etherification or esterification.

Preferred polyoxymethylene (POM) copolymers have melting points of at least 150° C. and weight average molecular weights M$_w$ in the range from 5 000 g/mol to 300 000 g/mol, preferably from 6 000 g/mol to 150 000 g/mol, particularly preferably in the range from 7 000 g/mol to 100 000 g/mol.

Particular preference is given to polyoxymethylene (POM) copolymers having a polydispersity (M$_w$/M$_n$) of from 2 to 15, preferably from 2.5 to 12, particularly preferably from 3 to 9.

The measurement of the weight average molecular weight (M$_w$) and the number average molecular weight (M$_n$) is generally carried out by gel permeation chromatography (GPC). GPC is also known as sized exclusion chromatography (SEC).

Methods for the preparation of polyoxymethylene (POM) are known to those skilled in the art.

Component (b2)/Polyolefin (PO)

The terms "component (b2)" and "polyolefin (PO)" for the purpose of the present invention are synonymous and are used interchangeably throughout the present invention According to the present invention, component (b), the binder (B), comprises from 2 to 35% by weight of component (b2). In a preferred embodiment, the binder (B) comprises from 3 to 20% by weight of component (b2) and particularly preferably from 4 to 15% by weight of component (b2), based on the total amount of the binder (B).

According to the present invention, component (b2) is at least one polyolefin (PO). "At least one polyolefin (PO)" within the present invention means precisely one polyolefin (PO) and also mixtures of two or more polyolefins (PO).

Polyolefins (PO) are known per se and are commercially available. They are usually prepared by polymerization of C$_2$-C$_8$-alkene monomers, preferably by polymerization of C$_2$-C$_4$-alkene monomers.

Within the context of the present invention, C$_2$-C$_8$-alkene means unsubstituted or at least monosubstituted hydrocarbons having 2 to 8 carbon atoms and at least one carbon-carbon double bond (C—C-double bond). "At least one carbon-carbon double bond" means precisely one carbon-carbon double bond and also two or more carbon-carbon double bonds.

In other words, C$_2$-C$_8$-alkene means that the hydrocarbons having 2 to 8 carbon atoms are unsaturated. The hydrocarbons may be branched or unbranched. Examples for C$_2$-C$_8$-alkenes with one C—C-double bond are ethene, propene, 1-butene, 2-butene, 2-methyl-propene (=isobutylene), 1-pentene, 2-pentene, 2-methyl-1-butene, 3-methyl-1-butene, 1-hexene, 2-hexene, 3-hexene and 4-methyl-1-pentene. Examples for C$_2$-C$_8$-alkenes having two or more C—C-double bonds are allene, 1,3-butadiene, 1,4-pentadiene, 1,3-pentadiene, 2-methyl-1,3-butadiene (=isoprene).

If the C$_2$-C$_8$-alkenes have one C—C-double bond, the polyolefins (PO) prepared from those monomers are linear. If more than one double bond is present in the C$_2$-C$_8$-alkenes, the polyolefins (PO) prepared from those monomers can be crosslinked. Linear polyolefins (PO) are preferred.

It is also possible to use polyolefin (PO) copolymers, which are prepared by using different C$_2$-C$_8$-alkene monomers during the preparation of the polyolefins (PO).

Preferably, the polyolefins (PO) are selected from the group consisting of polymethylpentene, poly-1-butene, polyisobutylene, polyethylene and polypropylene. Particular preference is given to polyethylene and polypropylene and also their copolymers as are known to those skilled in the art and are commercially available.

The polyolefins (PO) can be prepared by any polymerization process known to the skilled person, preferably by free radical polymerization, for example by emulsion, bead, solution or bulk polymerization. Possible initiators are, depending on the monomers and the type of polymerization, free radical initiators such as peroxy compounds and azo compounds with the amounts of initiator generally being in the range from 0.001 to 0.5% by weight, based on the monomers.

Component (b3)/Further Polymer (FP)

The terms "component (b3)" and "further polymer (FP)" for the purpose of the present invention are synonymous and are used interchangeably throughout the present invention According to the present invention, component (b), the binder (B), comprises from 2 to 40% by weight of component (b3). In a preferred embodiment, the binder (B) comprises from 5 to 30% by weight of component (b3) and particularly preferably from 10 to 26% by weight of component (b3), based on the total amount of the binder (B).

Component (b3) according to the present invention is at least one further polymer (FP). "At least one further polymer (FP)" within the present invention means precisely one further polymer (FP) and also mixtures of two or more further polymers (FP).

As already stated above, the at least one further polymer (FP) differs from component (b1), the polyoxymethylene (POM), and component (b2), the polyolefin (PO).

According to the present invention, the at least one further polymer (FP) is preferably selected from the group consisting of a polyether, a polyurethane, a polyepoxide, a polyamide, a vinyl aromatic polymer, a poly(vinyl ester), a poly(vinyl ether), a poly(alkyl(meth)acrylate) and copolymers thereof.

Another object of the present invention is therefore the use of a mixture (M) in a fused filament fabrication process, wherein the further polymer (FP) is at least one further polymer (FP) selected from the group consisting of a polyether, a polyurethane, a polyepoxide, a polyamide, a vinyl aromatic polymer, a poly(vinyl ester), a poly(vinyl ether), a poly(alkyl (meth)acrylate) and copolymers thereof.

Preferably, component (b3), the at least one further polymer (FP), is selected from the group consisting of a poly (C$_2$-C$_6$-alkylene oxide), an aliphatic polyurethane, an aliphatic uncrosslinked epoxide, an aliphatic polyamide, a vinyl aromatic polymer, a poly(vinyl ester) of an aliphatic C$_1$-C$_8$ carboxylic acid, a poly(vinyl ether) of a C$_1$-C$_8$ alkyl vinyl ether, a poly(alkyl(meth)acrylate) of a C$_{1-8}$-alkyl and copolymers thereof.

Preferred at least one further polymers (FP) are described in more detail below.

Polyethers comprise repeating units of formula (V).

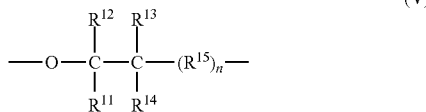

wherein
  $R^{11}$ to $R^{14}$ are each independently of one another selected from the group consisting of H, $C_1$-$C_4$-alkyl and halogen-substituted $C_1$-$C_4$-alkyl;
  $R^{15}$ is selected from the group consisting of a chemical bond, a (—$CR^{15a}R^{15b}$—) group and a (—$CR^{15a}R^{15b}O$—)group,
  wherein
    $R^{15a}$ and $R^{15b}$ are each independently of one another selected from the group consisting of H and unsubstituted or at least monosubstituted $C_1$-$C_4$-alkyl,
      wherein the substituents are selected from the group consisting of F, Cl, Br, OH and $C_1$-$C_4$-alkyl;
    is 0, 1, 2 or 3.

If n is 0, then $R^{15}$ is a chemical bond between the adjacent carbon atom and the oxygen atom. If $R^{15}$ is a (—$CR^{15a}R^{15b}O$—) group, then the oxygen atom (O) of the (—$CR^{15a}R^{15b}O$—) group is bound to another carbon atom (C) of formula (V) and not to the oxygen atom (O) of formula (V). In other words, formula (V) does not comprise peroxide compounds. The same holds true for formula (VI).

Typical polyethers as well as their preparation are known to the skilled person.

A preferred polyether according to the present invention is, for example, a poly(alkylene glycol), also known as a poly(alkylene oxide).

Polyalkylene oxides and their preparation are known to the skilled person. They are usually synthesized by interaction of water and a bi- or polyvalent alcohol with cyclic ethers, i. e. alkylene oxides, of the general formula (VI). The reaction is catalyzed by an acidic or basic catalyst. The reaction is a so called ring-opening polymerization of the cyclic ether of the general formula (VI).

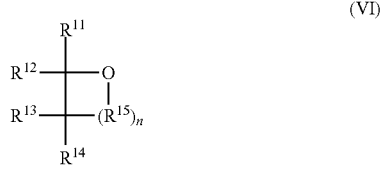

wherein
  $R^{11}$ to $R^{15}$ have the same meanings as defined above for formula (V).

A preferred poly(alkylene oxide) according to the present invention is derived from monomers of the general formula (VI) having 2 to 6 carbon atoms in the ring. In other words, preferably, the poly(alkylene oxide) is a poly($C_2$-$C_6$-alkylene oxide). Particular preference is given to a poly(alkylene oxide) derived from monomers selected from the group consisting of 1,3-dioxolane, 1,3-dioxepane and tetrahydrofuran (IUPAC-name: oxolane). In other words, particularly preferably, the poly(alkylene oxide) is selected from the group consisting of poly-1,3-dioxolane, poly-1,3-dioxepane and polytetrahydrofuran.

In one embodiment, the poly(alkylene oxide) can comprise OH-end groups. In another embodiment, at least some of the OH-end groups of the poly(alkylene oxide) can be capped. Methods for capping OH-end groups are known to the skilled person. For example, the OH-end groups can be capped by etherification or esterification.

The weight average molecular weight of the poly(alkylene oxide) is preferably in the range of from 1 000 to 150 000 g/mol, particular preferably from 1 500 to 120 000 g/mol and more preferably in the range of from 2 000 to 100 000 g/mol.

A polyurethane is a polymer having carbamate units. Polyurethanes as well as their preparation is known to the skilled person.

Within the present invention, aliphatic polyurethanes are preferred. They can, for example, be prepared by polyaddition of aliphatic polyisocyanates and aliphatic polyhydroxy compounds. Among the polyisocyanates, diisocyanates of the general formula (VII) are preferred

wherein
  $R^7$ is a substituted or unsubstituted $C_1$-$C_{20}$-alkylene or $C_4$-$C_{20}$-cycloalkylene, wherein the substituents are selected from the group consisting of F, Cl, Br and $C_1$-$C_6$-alkyl.

Preferably $R^7$ is a substituted or unsubstituted $C_2$-$C_{12}$-alkylene or $C_6$-$C_{15}$-cycloalkylene.

Within the context of the present invention, definitions such as $C_1$-$C_{20}$-alkylene means $C_1$-$C_{20}$-alkanediyle. The $C_1$-$C_{20}$-alkylene is a hydrocarbon having two free valences and a carbon atom number of from 1 to 20. The $C_1$-$C_{20}$-alkylene according to the present invention can be branched or unbranched.

Within the context of the present invention, definitions such as $C_4$-$C_{20}$-cycloalkylene means $C_4$-$C_{20}$-cycloalkanediyle. A $C_4$-$C_{20}$-cycloalkylene is a cyclic hydrocarbon having two free valences and a carbon atom number of from 4 to 20. Hydrocarbons having two free valences, a cyclic and also a linear component and a carbon atom number of from 4 to 20 likewise fall under this definition.

Preferred diisocyanates are selected from the group consisting of hexamethylene diisocyanate, 2,2,4-trimethyl hexamethylene diisocyanate, 2,4,4-trimethyl hexamethylene diisocyanate, 1,2-diisocyanatomethyl cyclohexane, 1,4-diisocyanatomethyl cyclohexane and isophoron diisocyanate (IUPAC-name: 5-iso-cyanato-1-(isocyanatomethyl)-1,3,3-trimethyl-cyclohexane).

The diisocyanates may also be used in oligomeric, for example dimeric or trimeric form. Instead of the polyisocyanates, it is also possible to use conventional blocked polyisocyanates which are obtained from the stated isocyanates, for example by an addition reaction of phenol or caprolactam.

Suitable polyhydroxy compounds for the preparation of aliphatic polyurethanes are, for example, polyesters, polyethers, polyesteramides or polyacetales or mixtures thereof.

Suitable chain extenders for the preparation of the polyurethanes are low molecular weight polyols, in particular diols and polyamines, in particular diamines or water.

The polyurethanes are preferably thermoplastic and therefore preferably essentially uncrosslinked, i. e. they can be melted repeatedly without significant signs of decomposition. Their reduced specific viscosities are as a rule from 0.5 to 3 dl/g, preferably from 1 to 2 dl/g measured at 30° C. in dimethylformamide.

A polyepoxide comprises at least two epoxide groups. The epoxide groups are also known as glycidyl or oxirane groups. "At least two epoxide groups" mean precisely two epoxide groups and also three or more epoxide groups.

Polyepoxides and their preparation is known to the person skilled in the art. For example, polyepoxides are prepared by the reaction of epichlorhydrine (IUPAC-name: chlormethyloxirane) and a diol, a polyol or a dicarboxylic acid. Polyepoxides prepared in this way are polyethers having epoxide end groups.

Another possibility to prepare polyepoxides is the reaction of glycidyl(meth)acrylate (IUPAC-name: oxiran-2-yl-methyl-2-methylprop-2-enoate) with polyolefins or polyacrylates. This results in polyolefins or polyacrylates having epoxy end groups.

Preferably, aliphatic uncrosslinked polyepoxides are used. Copolymers of epichlorhydrine and 2,2-bis-(4-hydroxyphenyl)-propane (bisphenol A) are particularly preferred.

Component (b3) (the at least one further polymer (FP)) can also comprise a polyamide. Aliphatic polyamides are preferred.

The intrinsic viscosity of suitable polyamides is generally from 150 to 350 ml/g, preferably from 180 to 275 ml/g. Intrinsic viscosity is determined here from a 0.5% by weight solution of the polyamide in 96% by weight sulfuric acid at 25° C. in accordance with ISO 307.

Preferred polyamides are semicrystalline or amorphous polyamides.

Examples of polyamides suitable as component (b3) are those that derive from lactams having from 7 to 13 ring members. Other suitable polyamides are those obtained through reaction of dicarboxylic acids with diamines.

Examples that may be mentioned of polyamides that derive from lactams are polyamides that derive from polycaprolactam, from polycaprylolactam, and/or from polylaurolactam.

If polyamides are used that are obtainable from dicarboxylic acids and diamines, dicarboxylic acids that can be used are alkanedicarboxylic acids having from 6 to 14 carbon atoms, preferably from 6 to 10 carbon atoms. Aromatic dicarboxylic acids are also suitable.

Examples that may be mentioned here as dicarboxylic acids are adipic acid, azelaic acid, sebacic acid, dodecanedicarboxylic acid, and also terephthalic acid and/or isophthalic acid.

Examples of suitable diamines are alkanediamines, having from 4 to 14 carbon atoms, in particular alkanediamines having from 6 to 8 carbon atoms, and also aromatic diamines, for example m-xylylenediamine, di(4-aminophenyl)methane, di(4-aminocyclohexyl)methane, 2,2-di(4-aminophenyl)propane, 2,2-di(4-aminocyclohexyl)-propane, and 1,5-diamino-2-methylpentane.

Other suitable polyamides are those obtainable through copolymerization of two or more of the monomers mentioned above and mentioned below, and mixtures of a plurality of polyamides in any desired mixing ratio.

Preferred polyamides are polyhexamethyleneadipamide, polyhexamethylene-sebacamide, and polycaprolactam, and also nylon-6/6,6, in particular having a proportion of from 75 to 95% by weight of caprolactam units.

Particular preference is given to mixtures of nylon-6 with other polyamides, in particular with nylon-6/6,6 (PA 6/66), particular preference being given to mixtures of from 80 to 50% by weight of PA 6 and from 20 to 50% by weight of PA 6/66, where the PA 6/66 comprises from 75 to 95% by weight of caprolactam units, based on the total weight of the PA 6/66 in the mixture.

The following, non-exclusive list comprises the above-mentioned polyamides, and other suitable polyamides, and also the monomers comprised.

AB Polymers:
PA 4 Pyrrolidone
PA 6 ε-Caprolactam
PA 7 Enantholactam
PA 8 Caprylolactam
PA 9 9-Aminopelargonic acid
PA 11 11-Aminoundecanoic acid
PA 12 Laurolactam AA/BB polymers:
PA 46 Tetramethylenediamine, adipic acid
PA 66 Hexamethylenediamine, adipic acid
PA 69 Hexamethlyenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA MXD6 m-Xylylenediamine, adipic acid
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 6 Diaminodicyclohexylmethane, adipic acid
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid Preferred polyamides are PA 6, PA 66 and PA PACM 6.

Vinyl aromatic polymers are polyolefins having unsubstituted or at least monosubstituted styrene as monomer unit. Suitable substituents are, for example, $C_1$-$C_6$-alkyls, F, Cl, Br and OH. Preferred vinyl aromatic polymers are selected from the group consisting of polystyrene, poly-a-methylstyrene and copolymers thereof with up to 30% by weight of comonomers selected from the group consisting of acrylic esters, acrylonitrile and methacrylonitrile.

Vinyl aromatic polymers are commercially available and known to the person skilled in the art. The preparation of these polymers is also known to the person skilled in the art.

Preferably, the vinyl aromatic polymers are prepared by free radical polymerization, for example by emulsion, bead, solution or bulk polymerization. Possible initiators are, depending on the monomers and the type of polymerization, free radical initiators such as peroxide compounds and azo compounds with the amounts of initiator generally being in the range from 0.001 to 0.5% by weight, based on the monomers.

Poly(vinyl esters) and their preparation are known to the skilled person. Poly(vinyl esters) are preferably prepared by polymerization of vinyl esters. In a preferred embodiment of the present invention, the vinyl esters are vinyl esters of aliphatic $C_1$-$C_6$ carboxylic acids. Preferred monomers are vinyl acetate and vinyl propionate. These monomers form poly(vinyl acetate) and poly(vinyl propionate) polymers.

Poly(vinyl ethers) are prepared by polymerization of vinyl ether monomers. Poly(vinyl ethers) and their preparation are known to the skilled person. In a preferred embodiment, the vinyl ethers are vinyl ethers of aliphatic $C_1$-$C_8$ alkyl ethers. Preferred monomers are methyl vinyl ether and ethyl vinyl ether, forming poly(methyl vinyl ether) and poly(ethyl vinyl ether) during the polymerization.

Preferably, the poly(vinyl ethers) are prepared by free radical polymerization, for example by emulsion, bead, solution, suspension or bulk polymerization. Possible initiators are, depending on the monomers and the type of polymerization, free radical initiators such as peroxide compounds and azo compounds with the amounts of initiator generally being in the range from 0.001 to 0.5% by weight, based on the monomers.

Poly(alkyl(meth)acrylate) within the present invention comprises poly(alkyl acrylate), poly(alkyl methacrylates) and copolymers thereof. Poly(alkyl(meth)acrylate) comprises units derived from monomers of formula (VIII),

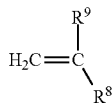

(VIII)

wherein $R^8$ is selected from the group consisting of H and $C_1$-$C_8$-alkyl and $R^9$ is a radical of formula (IX)

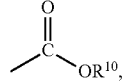

(IX)

wherein $R^{10}$ is a $C_1$-$C_{14}$-alkyl.

Preferably, $R^8$ is selected from the group consisting of H and $C_1$-$C_4$-alkyl, particularly preferably $R^8$ is H or methyl. Preferably, $R^{10}$ is a $C_1$-$C_8$-alkyl, particularly preferably, $R^{10}$ is methyl or ethyl.

If $R^8$ in formula (VIII) is H and $R^9$ is a radical of formula (IX) and $R^{10}$ in formula (IX) is methyl, then the monomer of formula (VIII) is methyl acrylate.

If $R^8$ in formula (VIII) is H and $R^9$ is a radical of formula (IX) and $R^{10}$ in formula (IX) is ethyl, the monomer of formula (VIII) is ethyl acrylate.

If $R^8$ in formula (VIII) is methyl and $R^9$ is a radical of formula (IX), then the monomers of formula (VI) are methacrylic esters.

Poly(alkyl(meth)acrylates) comprise as monomers preferably 40 to 100% by weight of methacrylic esters, particularly preferably 70 to 100% by weight of methacrylic esters and more preferably from 80 to 100% by weight of methacrylic esters, each based on the total amount of the poly(alkyl(meth)acrylates).

In another preferred embodiment, the poly(alkyl(meth) acrylates) comprise as monomers from 20 to 100% by weight of methyl acrylate, ethyl acrylate or a mixture thereof, preferably from 40 to 100% by weight of methyl acrylate, ethyl acrylate or a mixture thereof and particularly preferably from 50 to 100% by weight of methyl acrylate, ethyl acrylate or mixtures of thereof, each based on the total weight of the poly(alkyl(meth)acrylate).

Such polymers of monomers of the formula (VIII) with or without further monomers can be prepared in a conventional, preferably a free radical polymerization, for example an emulsion, bead, solution or bulk polymerization (cf. Kirk-Othmer, Encyclopedia of Chemical Technology $3^{rd}$ Ed., Vol. 1., pp. 330-342, Vol. 18, pp. 720-755, J. Wiley; H. Rauch-Puntigam, Th. Völker, Acryl- and Methacrylverbindungen). Possible initiators depending on the monomers and the type of polymerization are free radical initiators, such as peroxy or peroxo compounds and azo compounds. The amount of initiator being in general within the range from 0.001 to 0.5% by weight, based on the monomers.

Suitable initiators for an emulsion polymerization are, for example, peroxodisulfates and redox systems for a bulk polymerization not only peroxides, such as dibenzoyl peroxide or dilauroyl peroxide, but also azo compounds, for example azobisisobutyrodinitrile, similarly in the case of the solution or bead polymerization. The molecular weight may be regulated using conventional regulators, in particular mercaptans, e. g. dodecylmercaptan.

Preferably, the polymerization is carried out at elevated temperatures, for example above 50° C. The weight average molecular weight ($M_w$) is in general within the range of from 2 000 to 5 000 000 g/mol, preferably from 20 000 to 3 000 000 g/mol (determination by light scattering; cf. HoubenWeyl, Methoden der Org. Chemie, $4^{th}$ edition, Volume 14/1, Georg Thieme-Verlag Stuttgart 1961).

The person skilled in the art knows that the monomers described above for the preparation of the components (b1), (b2) and (b3) can undergo changes in their structure during the polymerization reaction. Consequently, the building units of the polymers are not the same as the monomers from which they are derived. However, the person skilled in the art knows which monomers correspond to which building unit of the polymers.

Under the conditions of compounding or processing by fused filament fabrication, virtually no transacetalization occurs between component (b1), the polyoxymethylene (POM), and component (b3), the at least one further polymer (FP), i. e. virtually no exchange of comonomer units takes place.

Component (c)/Dispersant

The terms "component (c)" and "dispersant" for the purpose of the present invention are synonymous and are used interchangeably throughout the present invention In one embodiment of the present invention, the mixture (M) comprises from 0 to 5% by volume of component (c). In a preferred embodiment, the mixture (M) comprises from 0.1 to 4% by volume of component (c) and particularly preferably from 1 to 3% by volume of component (c), each based on the total volume of the mixture (M).

As component (c), at least one dispersant can be used. "At least one dispersant" according to the present invention means precisely one dispersant and also mixtures of two or more dispersants.

The dispersant can be selected from among known dispersants. Examples are oligomeric polyethylene oxide having a low molecular weight of from 200 to 600 g/mol, stearic acid, stearamides, hydroxystearic acids, fatty alcohols, fatty alcohol sulfonates and block copolymers of ethylene oxide and propylene oxide and also, particularly preferably, polyisobutylene.

Process for Producing a Three-Dimensional Object

The above mentioned embodiments and preferences in respect of the mixture (M) comprising components (a), component (b) and optionally component (c) apply analogously to the process for producing the three-dimensional object.

The fused filament fabrication process for the production of three-dimensional objects is well known in the state of the art and detailed explained in the above cited documents. The fused filament fabrication process is also denominated as 3D-printing process.

Another object of the present invention is a process for the production of a three-dimensional green body by a fused filament fabrication process comprising the steps
  i) providing the inventive mixture (M) to a nozzle,
  ii) heating the mixture (M) to a temperature ($T_M$),
  iii) depositing the mixture (M) into a build chamber using a layer-based additive technique to form the three-dimensional green body.

According to step (i), the mixture (M) is provided to a nozzle. Normally, the mixture (M) is provided to the nozzle in a solid state. It can be provided in form of a filament as well as in granulate or powder form. The mixture (M) comprises the above stated components. If the three-dimensional object to be prepared comprises a metal alloy, the mixture (M) can either comprise a powder of the already prepared metal alloy or a mixture of powders of the individual metal alloy constituents, i. e. the metal and the other element as described above. The metal alloy will then form during the preparation of the three-dimensional object.

Methods for the preparation of filaments, granulates or powders are well known in the state of the art.

According to step (ii), the mixture (M) is heated to a temperature ($T_M$). The temperature ($T_M$) is above the melting point of the binder (B). Methods for the determination of the melting point of the binder (B) are known to the skilled person. For example, the melting point of the binder (B) can be estimated by differential scanning calorimetry (DSC).

In a preferred embodiment according to the present invention, in process step (ii) the mixture (M) is heated to a temperature ($T_M$) that is at least 1° C., preferably at least 5° C. and particularly preferably at least 10° C. above the melting point of the binder (B).

In another preferred embodiment the mixture (M) is heated to a temperature ($T_M$) in the range of from 140 to 240° C., preferably of from 160 to 220° C.

Another object of the present invention is therefore a process for the production of a three-dimensional green body, wherein the temperature ($T_M$) in step ii) is from 140 to 240° C.

According to step (iii), the mixture (M) is deposited into a build chamber using the layer-based additive technique. The temperature of the build chamber is usually in the range of from 30 to 100° C., preferably of from 40 to 90° C. and particularly preferably of from 50 to 80° C.

The fused filament fabrication process, for example, can be carried out by the sequential discharging of discontinuous drops of a thermoformable material. The thermoformable material is plasticized in the fluid phase and is introduced into a material store having at least one discharging unit which can be clocked. From there, the material is discharged in a dropwise manner by means of a discharging unit in the direction of an object carrier for an object wherein the object carrier and an outlet opening can be moved at a relative spacing in relation to one another in space in order to influence the drop shape. The creation of the drops is supported by changing the relative space in an alternating manner in opposite directions during the discharging of the drops from the discharging unit and during the application of the drops to the three-dimensional object during the production of the object. This process is described in WO 2012/028308.

In other words, in step (i) to (iii) of the inventive process, the mixture (M) generally is initially present in a solid state and thereafter melted and printed to form a three-dimensional object comprising the mixture (M). The so prepared three-dimensional object is also called "three-dimensional green body".

In one embodiment of the present invention, process step (iii) is followed by a process step (iv) in which at least part of the binder (B) is removed from the three-dimensional green body. The at least partial removal of the binder (B) is also called debinding. The terms "process step (iv)" and "debinding" for the purpose of the present invention are synonymous and are used interchangeably throughout the present invention.

Another object of the present invention is therefore a process for the production of a three-dimensional green body, wherein step iii) is followed by a step iv), in which at least part of the binder is removed from the three-dimensional green body to form a three-dimensional brown body.

After the partial removal of the binder (B), the resulting three-dimensional object is called a "three-dimensional brown body". The three-dimensional brown body comprises the inorganic powder (IP) and the fraction of the binder (B), which was not removed during the debinding. The person skilled in the art knows that a three-dimensional brown body comprising a ceramic material as inorganic powder (IP) is also called a three-dimensional white body. However, for the purpose of the present invention, the terms "three-dimensional brown body" and "three-dimensional white body" are used synonymous and are interchangeably.

To remove at least part of the binder (B) in process step (iv), the three-dimensional green body obtained by the fused filament fabrication process is preferably treated with a gaseous acid comprising atmosphere. Appropriate processes are described, for example, in US 2009/0288739 and U.S. Pat. No. 5,145,900. This process step (iv) is, according to the invention, preferably carried out at temperatures below the melting temperature of the binder (B). Process step (iv) is preferably carried out at a temperature at least 1° C. below the melting point of the binder (B), preferably at least 5° C. below the melting point of the binder (B) and particularly preferably at least 10° C. below the melting point of the binder (B).

Another object of the present invention is therefore a process for the production of a three-dimensional green body, wherein in step iv) the binder (B) is removed at a temperature below the melting point of the binder (B).

In general, the process step (iv) is carried out at a temperature in the range of from 20 to 180° C. and particularly preferably of from 100 to 150° C. Preferably, process step (i) is carried out for a period of from 0.1 to 24 h, particularly preferably of from 0.5 to 12 h.

The treatment time required depends on the treatment temperature and the concentration of the acid in the treatment atmosphere and also on the size of the three-dimensional object.

Another object of the present invention is therefore a process for the production of a three-dimensional green body, wherein in step iv) the binder (B) is removed by acidic treatment.

Suitable acids for process step (iv) of the present invention are, for example, inorganic acids which are either gaseous at room temperature or can be vaporized at the treatment temperature or below. Examples are hydrogen halides and nitric acid. Hydrogen halides are hydrogen fluoride, hydrogen chloride, hydrogen bromide and hydrogen iodide. Suitable organic acids are those, which have a boiling point at atmosphere pressure of less than 130° C., e. g. formic acid, acetic acid or trifluoroacetic acid and mixtures thereof. Acids with boiling points above 130° C., for example methanesulfonic acid, can also be utilized in process step iv) when dosed as a mixture with a lower boiling acid and/or water. Preferred acids for process step (iv) are nitric acid, a 10% by weight solution of oxalic acid in water or a mixture of 50% by volume of methanesulforic acid in water.

Furthermore, $BF_3$ and its adducts with inorganic ethers can be used as acids.

If a carrier gas is used, the carrier gas is generally passed through the acid and loaded with the acid beforehand. The carrier gas, which has been loaded in this way with the acid, is then brought to the temperature at which process step (iv) is carried out. This temperature is is advantageously higher than the loading temperature in order to avoid condensation of the acids. Preferably the temperature at which process step (iv) is carried out is at least 1° C., particularly preferably at least 5° C. and most preferably at least 10° C. higher than the loading temperature.

Preference is given to mixing the acid into the carrier gas by means of a metering device and heating the gas mixture to such a temperature that the acid can no longer condense. Preferably the temperature is at least 1° C., particularly preferably at least 5° C. and most preferably at least 10° C. higher than the sublimation and/or vaporization temperature of the acid and/or the carrier gas.

The carrier gas in general is any gas that is inert under the reaction conditions of the debinding step. A preferred carrier gas according to the present invention is nitrogen.

The debinding is preferably continued until the polyoxymethylene (POM), component (b1), of the binder (B) has been removed to an extend of at least 80% by weight, preferably at least 90% by weight, particularly preferably at least 95% by weight, based on the total weight of component (b1). This can be checked, for example, with the height of the weight decrease.

It is known to the skilled person that at the temperatures of the debinding step, the inorganic powder (IP) comprised in the three-dimensional green body can undergo chemical and/or physical reactions. In particular, the particles of the inorganic powder (IP) can fuse together and the inorganic powder can undergo solid state phase transitions.

The same holds true for the binder (B). During the debinding step the composition of the binder (B) can change.

Consequently, in one embodiment of the present invention, the inorganic powder (IP) and/or the binder (B) comprised in the three-dimensional green body obtained in process step (iv) differs from the inorganic powder (IP) and/or the binder (B) comprised in the three-dimensional brown body obtained in process step (iii).

Process step (iv) can be followed by a process step (v) in which the three-dimensional brown body is sintered. Process step (v) is also called sintering. The terms "process step (v)" and "sintering" for the purpose of the present invention are synonymous and are used interchangeably throughout the present invention.

Another object of the present invention is therefore a process for the production of a three-dimensional green body, wherein step iv) is followed by a step v), in which the three-dimensional brown body is sintered to form a three-dimensional sintered body.

After the sintering, the three-dimensional object is a three-dimensional sintered body. The three-dimensional sintered body comprises the inorganic powder (IP) and is essentially free of the binder (B).

"Essentially free of the binder (B)" according to the present invention means that the three-dimensional sintered body comprises less than 5% by volume, preferably less than 2% by volume, particularly preferably less than 0.5% by volume and most preferably less than 0.01% by volume of the binder (B) based on the total volume of the three-dimensional sintered body.

It is known to the skilled person that during the sintering process the inorganic powder (IP) is sintered together to give a sintered inorganic powder. Furthermore, during the sintering process the inorganic powder (IP) can undergo chemical and/or physical reactions. Consequently, the inorganic powder (IP) comprised in the three-dimensional brown body usually differs from the sintered inorganic powder comprised in the three-dimensional sintered body.

In one embodiment of the present invention, after process step (iv) and before process step (v), the three-dimensional brown body obtained in process step (iv) is heated for preferably 0.1 to 12 h, particularly preferably from 0.3 to 6 h, at a temperature of preferably from 250 to 700° C., particularly preferably from 250 to 600° C. to remove the residual binder (B) completely.

The temperature as well as the duration and the atmosphere during process step (v) depends on the inorganic powder comprised in the mixture (M) as component (a). The temperature programme of the sintering process, the duration and the atmosphere is in general adapted to the needs of the inorganic powder (IP) comprised in the mixture (M) as component (a). Suitable conditions for process step (v) are known to the skilled person.

In general, process step (v) is carried out under the atmosphere of a gas that is inert with regard to the inorganic powder (IP) and the binder (B). Typical inert gases are for example nitrogen and/or argon.

Depending on the inorganic powder (IP) comprised in the mixture (M), it is also possible to carry out process step (v) in air, under vaccum or in hydrogen atmosphere.

The temperature in process step (v) is in general in the range of from 750 to 1600° C., preferably of from 800 to 1500° C. and particularly preferably of from 850 to 1450° C.

The invention claimed is:

1. A process for the production of a three-dimensional green body by a fused filament fabrication process, comprising: heating a mixture (M) to a temperature ($T_M$), and
depositing the mixture (M) into a build chamber using a layer-based additive technique to form the three-dimensional green body, wherein the temperature of the build chamber is in the range of from 50° to 80° C.,
wherein the mixture (M) comprises:
(a) from 40 to 70% by volume of an inorganic powder (IP) based on the total volume of the mixture (M),
(b) from 30 to 60% by volume based on the total volume of the mixlure (M) of a binder (B) consisting of
(b1) from 70 to 96% by weight of at least one polyoxymethylene (POM) based on the total weight of the binder (B),
(b2) from 2 to 15% by weight of at least one polyolefin (PO) based on the total weight of the binder (B), (b3) from 2 to 26% by weight of at least one further polymer (FP) based on the total weight of the binder (B), wherein the at least one further polymer (FP) is polytetrahydrofuran, said method further comprising, after the depositing, removing at least 95% by weight of component (b1), based on the total weight of component (b1), from the three-dimensional green body to form a three-dimensional brown body;

wherein the removal is carried out by acidic treatment and at a temperature in the range from 20 to 180° C.;

wherein the particle size of the inorganic powder (IP)) is from 0.1 to 80 μm.

2. The process according to claim 1, wherein the mixture (M) further comprises as a component (c) from 0.1 to 5% by volume of at least one dispersant based on the total volume of the mixture (M).

3. The process according to claim 1, wherein the inorganic powder (IP) is a powder of at least one inorganic material selected from the group consisting of a metal, a metal alloy and a ceramic material.

4. The process according to claim 1, wherein component (b1) is a polyoxymethylene (POM) copolymer which is prepared by polymerization of at least 50 mol-% of a formaldehyde source (b1a), from 0.01 to 20 mol-% of at least one first comonomer (b1b) of formula (II)

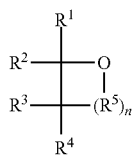

wherein $R^1$ to $R^4$ are each independently of one another selected from the group consisting of H, $C_1$-$C_4$-alkyl and halogen-substituted $C_1$-$C_4$-alkyl;

$R^5$ is selected from the group consisting of a chemical bond, a (—$CR^{5a}R^{5b}$—) group and a (—$CR^{5a}R^{5b}O$—) group wherein $R^{5a}$ and $R^{5b}$ are each independently of one another selected from the group consisting of H and unsubstituted or at least monosubstituted $C_1$-$C_4$-alkyl, wherein the at least monosubstituted $C_1$-$C_4$-alkyl substituents are selected from the group consisting of F, Cl, Br, OH and $C_1$-$C_4$-alkyl;

n is 0, 1, 2 or 3;

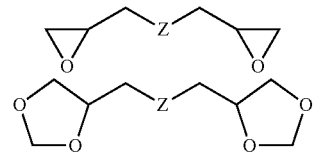

and from 0 to 20 mol-% of at least one second comonomer (b1c) selected from the group consisting of a compound of formula (III) and a compound of formula (IV)

wherein

Z is selected from the group consisting of a chemical bond, an (—O—) group and an (—O—$R^6$—O—) group, wherein $R^6$ is selected from the group consisting of unsubstituted $C_1$-$C_8$-alkylene and $C_3$-$C_8$-cycloalkylene.

5. The process according to claim 1, wherein the temperature ($T^M$) during the heating is from 140 to 240° C.

6. The process according to claim 1, wherein the removing of the binder (B) is performed at a temperature below the melting point of the binder (B).

7. The process according to claim 1, further comprising, after the removing of the binder (B), sintering the three-dimensional brown body to form a three-dimensional sintered body.

8. The process of claim 7, wherein the three-dimensional sintered body comprises less than 0.5% by volume of the binder (B) based on the total volume of the three-dimensional sintered body.

9. The process according to claim 1, wherein the mixture (M) is provided to a nozzle and is then heated to the temperature ($T_M$).

* * * * *